United States Patent [19]

Oase

[11] 4,079,480

[45] Mar. 21, 1978

[54] CLAMPING APPARATUS

[75] Inventor: Vernon S. Oase, Toledo, Ohio

[73] Assignee: Owens-Corning Fiberglas Corporation, Toledo, Ohio

[21] Appl. No.: 792,072

[22] Filed: Apr. 28, 1977

[51] Int. Cl.² .............................................. E05D 13/02
[52] U.S. Cl. .................................... 16/87 R; 16/87.2; 24/135 L; 52/584
[58] Field of Search ................ 16/87 R, 87.2; 52/584, 52/222; 24/135 N, 135 L

[56] References Cited

U.S. PATENT DOCUMENTS

| 725,048 | 4/1903 | Cutting | 24/135 L |
|---|---|---|---|
| 1,582,340 | 4/1926 | Milne | 24/135 L |
| 1,940,704 | 12/1933 | Sumpter | 24/135 L |
| 2,884,476 | 4/1959 | Lock et al. | 24/135 L |
| 3,879,916 | 4/1975 | Bigham | 52/584 |

Primary Examiner—Ronald Feldbaum

Attorney, Agent, or Firm—Ronald C. Hudgens; Charles R. Schaub; Philip R. Cloutier

[57] ABSTRACT

This invention relates to clamping apparatus defining a base plate having a male portion located at the first end and a female portion located at the second end. The base plate is adapted with apertures. First clamp plates are positioned longitudinally along each side of the base plate. The first clamp plates having a male portion located at the first end and a female portion located at the second end. The first clamp plate is adapted with first apertures that are in matching relationship with the apertures of the base plate and the first clamp plates have second apertures. Second clamp plates are positioned longitudinally along one side of the first clamp plates. The second clamp plates have a female portion located at the first end and a male portion located at the second. The second clamp plate is adapted with apertures in matching relationship to the second apertures of the first clamp plate.

8 Claims, 3 Drawing Figures

U.S. Patent   March 21, 1978   4,079,480
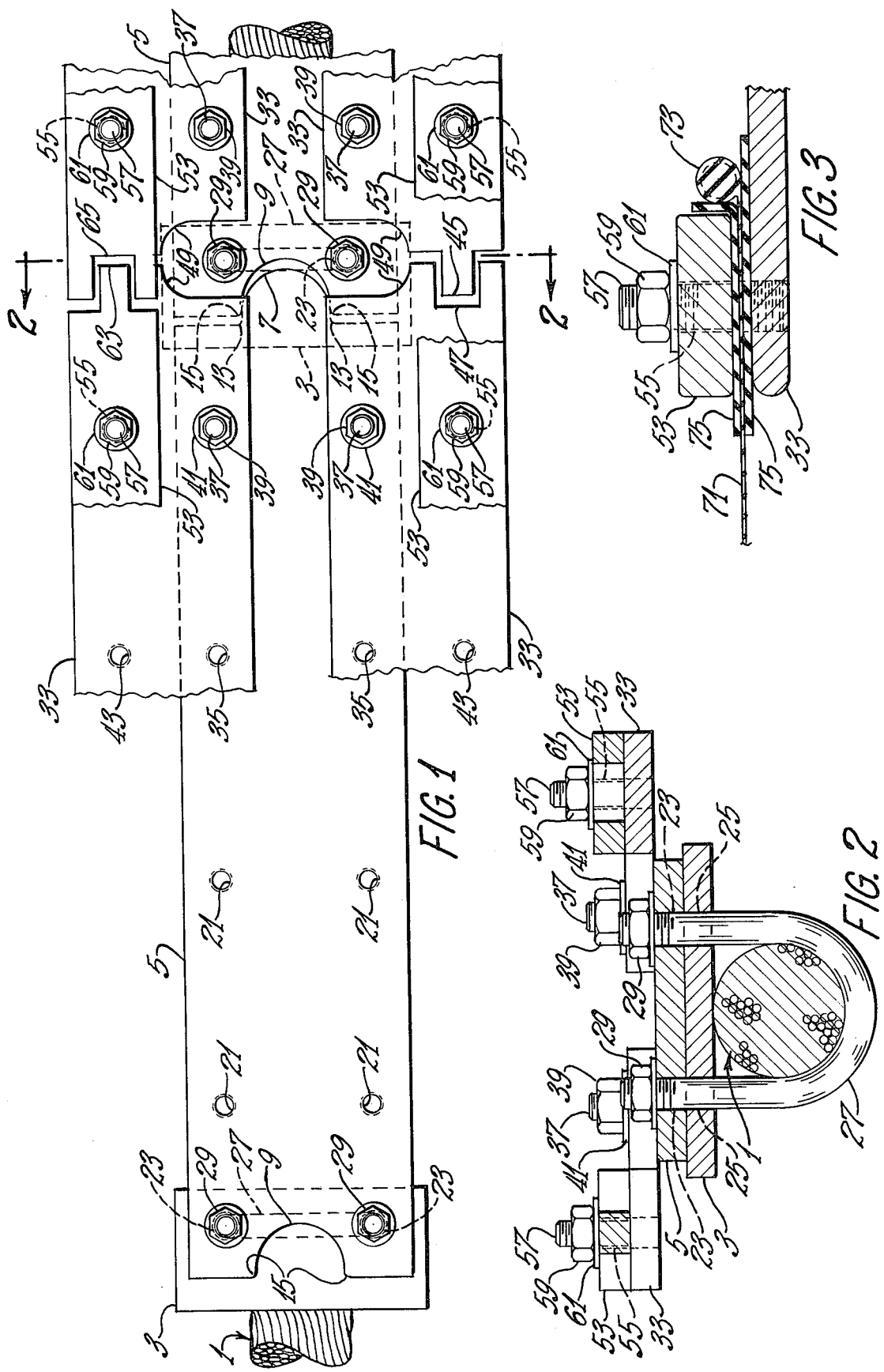

CLAMPING APPARATUS

This invention pertains to apparatus for clamping material. In one of its more specific aspects, the invention relates to apparatus for clamping fabric panels to a support cable where the clamping apparatus can accommodate movement of the support cable.

Fabric structures are becoming very popular today as a construction method. However, problems still exists in attaching the fabric panels to the support cables that are used to support the structure. In the past, metal plates were securely clamped to the cable and the fabric panels would, in turn, be clamped to the metal plates. However, when the fabric panels are stretched and attached to the plates unequal loads are often imposed upon the plates. These loads occur because the tension or load is not the same on each panel in the fabric structure. In any event, the unequal forces are frequently very high in certain areas of the fabric structure. These forces act against the support cables and plates and frequently these forces cause the plates and support cables to bend or flex. The bending or flexing of the plates is an undesirable phenomenon that should be avoided.

In addition, the fabric panels sometimes cannot be stretched sufficiently to allow them to be clamped to the plates without damaging the panels. Accordingly, the support cables and plates have to be moved towards the panels to attach the panels to the plate. However, since the prior art plates are solid and securely attached to the support cable, it is very difficult to move the plates towards the panel without removing the plates from the support cable.

Accordingly, it is desirable in the fabric structures industry to have a clamp plate that can bend or move to accommodate the forces supplied to the clamp plate and support cable by the fabric panels.

According to the invention there is provided apparatus for clamping fabric panels comprising a base plate having a male portion located at the first end, a female portion located at the second end, the base plate being adapted with apertures. First clamp plates are positioned longitudinally along each side of the base plate. The first clamp plates have a male portion located at the first end and a female portion located at the second end. The first clamp plates are adapted with first apertures in matching relationship with the apertures of the base plate. The first clamp plates are also adapted with second apertures. Second clamp plates are positioned longitudinally along one side of each of the first clamp plates. The second clamp plates have a female portion at the first end and a male portion located at the second end. The second clamp plates are adapted with apertures in matching relationship to the second apertures to the first clamp plates.

DESCRIPTION OF THE DRAWINGS

FIG. 1 is a top view of the clamping apparatus.

FIG. 2 is a cross sectional elevation view of the clamping apparatus taken along line 2—2 in FIG. 1.

FIG. 3 is a partial cross sectional view showing a fabric panel clamped in the clamping apparatus.

The apparatus of this invention will be more fully understood by referring to the attached drawings in relation to the following description.

In FIGS. 1 and 2 support cable 1 extends between opposite walls of a structure. The support cable normally comprises a plurality of smaller cables twisted together. Located on the support cable is a bearing plate 3 that extends across the diameter of the support cable. Positioned on the bearing plate is a base plate 5. The bearing plates are positioned along the cable so that there is a bearing plate under each end of the base plates. Each of the base plates has a male portion 7 located at one end and a female portion 9 located at the opposite end. The base plates 5 are positioned along the bearing plates so that the base plates extend longitudinally along the support cable. The base plates are also positioned so that the male portion on one base plate extends into the female portion located on the adjacent base plate. The male portion will normally not be in contact with the female portion on the adjacent base plate but will be spaced apart a small distance from the female portion. The ends of the base plates are also usually spaced apart from the end of adjacent base plates a small distance. In practice, it has been found that a spacing of ⅛ to ½ inch is an adequate spacing between adjacent male and female portions and ends of adjacent base plates.

The male portion 7 on the base plates is generally a semi-circular shaped projection that extends from the center region of the base plate. The male portion does not extend across the entire width of the base plate but extends centrally from the base plate. The male portion is connected to the end of the base plate with a radius section 13. The female portion is generally semi-circular and is located in the center region of the end of the base plate. The female portion is joined to the end of the base plate with a radius section 15. The radii of the semi-circular male and female portions on the base plates are usually substantially equal and the length and depth of the male and female portions correspond. Both male and female portions are located substantially along the longitudinal center line of the base plate. The radius of the male and female portions is also usually of a dimension that is ¼ or less of the width of the base plate.

Positioned along each side of the base plate are a plurality of holes or apertures 21. Also at the end of the base plate adapted with the female portion 9 there are located two apertures 23. The apertures 23 are in matching relationship with apertures 25 located in bearing plate 3. To secure the base plate to the bearing plate and to secure the base plate and bearing plate to the support cable, a U bolt 27 passes around the cable and through apertures 23 and apertures 25. Nuts 29 are positioned on the ends of each leg of the U bolt and these nuts are tightened to securely attach the base plate and bearing plate to the support cable. It should be noted that the base plate is only secured to the support cable at one end and this is normally the end containing the female portion.

First clamp plates 33 are positioned longitudinally along each side of the base plate. The first clamp plates are positioned with a first portion of the clamp plate in contact with the base plate and a second portion of the clamp extending beyond the longitudinal edge of the base plate. The first clamp plates each are adapted with a series of first apertures 35 that are in matching relationship with the apertures 21 located along each side of the base plate 5. Bolts 37 pass through the matching apertures and nuts 39 located on the ends of the bolts can be tightened to securely attach the first clamp plates to the base plate. Washers 41 are normally positioned under the nuts to keep the nuts from loosening. The first clamp plates also are adapted with a second series of apertures 43 that are located on that portion of the first clamp plate that extends beyond the edge of the base plate.

At opposite ends of the first clamp plates there are located tongue or male portion 45 and groove or female portion 47. The male and female portions are shown in the cut away portion of FIG. 1. The first clamp plates are positioned along the base plate so that the male portion on the end of one clamp plate extends into the female portion located on the end of the adjacent first clamp plate. However, the ends of the adjacent first clamp plates and the male and female portions on the adjacent first clamp plates are normally spaced apart a small distance. In practice it has been found that a spacing of $\frac{1}{8}$ to $\frac{1}{2}$ inch will provide a suitable spacing between the ends of adjacent first clamp plates and between the male and female portions on adjacent first clamp plates.

The ends of the first clamp plates also have a notched portion 49 located on the side of the clamp plate and positioned over the base plate. The function of the notched portion is to provide clearance for the nuts 29 and U bolt 27 that are used to attach the base plate to the support cable.

Positioned longitudinally along the outside edge of each of the clamp plates are second clamp plates 53. The second clamp plates are adapted with a series of apertures 55 that are in matching relationship with the second apertures 43 located on that portion of the first clamp plates that extends beyond the edge of the base plate. Bolts 57 passes through the matching apertures and nuts 59 located on the bolts can be tightened to securely position the second clamp plates on the first clamp plates. Washers 61 are normally positioned under the nuts to keep the nuts from loosening.

At opposite ends of the second clamp plates there is a tongue or male portion 63 and a groove or female portion 65. The second clamp plates are positioned on the first clamp plates so that the male portion on one clamp plate extends into the female portion on the adjacent clamp plate. The male portion is usually not in contact with the female portion on the adjacent second clamp plate. Instead, a small space usually is present between the male and female portions on adjacent second clamp plates. Also there is usually a small space between the ends of the adjacent second clamp plate. In practice it has been found that a space of $\frac{1}{8}$ to $\frac{1}{2}$ inch between the male and female portions and the end regions on adjacent second clamp plates provides adequate spacing.

The first and second clamp plates are attached to the base plates with each first and second clamp plate securely attached to only one base plate. The ends of the first and second clamp plates generally terminate near the ends of the base plates. The ends of the first and second clamp plates are positioned in overlapping relationship. Thus, the end of the second clamp plate, that is securely attached to the support cable by the first clamp plate and base plate, will overlap the end of the adjacent first clamp plate that is attached to the end of the adjacent base plate that is not connected to the support cable.

FIG. 3 shows a portion of the clamping apparatus where the first clamp plates 33 and second clamp plates 53 are used to secure a fabric panel 71. The fabric panel passes between the first and second clamp plates and terminates in a large diameter section 73 that is positioned against the interior side of the second clamp plate. A layer of a sealing material 75 is placed between the first and second clamp plates above and below the fabric panel. The bolt 57 passes through the first and second clamping plates, the layer of sealing material and the fabric panel. When nut 59 is tightened, it causes the end of the fabric panel to be securely held in place between the first and second clamp plates. A neoprene material works very satisfactorily as the sealing material.

In operation the base plate is installed on the bearing plate and support cable as previously described. Then the first clamp plates are attached to the base plate by bolts 37. The lower layer of sealing material 75 is then placed on the upper surface of the first clamp plates and over bolts 57 that are located in the first clamp plate. The fabric panel 71 with a layer of sealing material 75 on its upper surface is then positioned on the first base plate so that the bolt 57 passes through the fabric panel and layer of sealing material on the upper surface of the panel. Next second clamp plates 53 are positioned on the bolts 57 and on top of the fabric panel. The large diameter section 73 of the panel should rest against the interior surface of the second clamp plates. When nut 59 is tightened the fabric panel will be securely held between the first and second clamp plates. Since there is a sealing material above and below the fabric panel, a water-proof seal will be formed where the fabric panel is secured between the first and second clamp plates.

The fabric panels are normally installed between the first and second clamp plates that are located on each side of the base plate. Therefore, fabric panels will extend from both sides of the base plate. Frequently the fabric panels will have to be pulled very tightly to have the panels extend between the clamp plates that secure each side of the panel. After the fabric panel has been pulled and installed between the clamp plates the panel will exert a force through the clamping plates against the base plate and support cable. Often the fabric panels will produce unequal forces that tend to bend or deflect the base plates, the first and second clamping plates and support cable. These forces will tend to bend or flex the base plates and first and second clamping plates if they are not capable of moving to accommodate the forces.

Also the fabric panels sometimes cannot be adequately stretched to extend between the first and second clamp plates at each side of the panel without damaging the panel. Accordingly, it is sometimes very helpful to be able to bend the base plate, first and second clamp plates and support cable a small amount to bring the first and second clamp plates closer to the edge of the fabric panel to allow the panel to be clamped between the two clamp plates.

In the present invention, the base plates, first clamp plates and second clamp plates are designed to accommodate movement that is caused by the unequal force applied by the fabric panels. Since the base plates 5 are only connected to the support cable at one end, when the cable is moved in a direction parallel to the transverse axis of the base plates, the base plates will be able to pivot about their connection point to the cable to accommodate this movement. However, since the ends of the base plates are normally connected together by the intersection of the male and female portions on adjacent base plates, the base plates can only pivot to an extent provided for by the intersection of the male and female portions on the base plates. The small space between the male and female portions and between the ends of the adjacent base plates allows the base plates to pivot until the space no longer exists and the ends of the adjacent base plates are in contact. The radius sections at the ends of the male and female portions assist in allowing pivotal movement of the base plates around the joint between the male and female portions.

When the base plates pivot as described above, the first and second clamp plates are also caused to move in the same fashion. The space between the male and female portions on adjacent first and second clamp plates accommodates this movement by the clamp plates. However, once the space between the male and female portions is eliminated, the clamp plates will be in contact on one side and this will stop further pivotal movement of the clamp plates and concomitantly of the base plates.

Since the base plates are only secured to the support cable at one end there could be movement, at the unsecured end, in a direction parallel to the transverse axis of the base plates. However, the male and female portions on the base plates are designed so that there is only a very small space between adjacent male and female portions at the point where the portions are joined to the ends of the base plates with a radius section. The space between the adjacent male and female portions at the point where the male and female portions join the ends of the base plates is usually less than ⅛ inch. Therefore, the unsecured end of the base plates can move only a small distance in a direction parallel to the transverse axis of the base plates until the side of the male portion comes into contact with the side of the female portion. Since the female portion is secured to the support cable, the transverse motion of the male portion and the end of the adjacent base plate stops when the male portion contacts the side of the female portion. Thus, only very small non-pivotal transverse movement is permitted between the base plates.

Since only one end of the base plates is secured to the support cable, the unsecured end must be retained from moving in a direction away from the support cable. The overlapping male and female portions on the first and second clamp plates will prevent movement in this direction by the unsecured end of the base plates. The first and second clamp plates are attached to the base plates with each first and second clamp plate securely attached to only one base plate. Also, the ends of the first and second clamp plates generally terminate near the ends of the base plates. However, the ends of the first and second clamp plates are positioned in overlapping relationship. Thus, the end of the second clamp plate that is attached to the support cable by the first clamp plate and base plate, will overlap the end of the first clamp plate that is attached to the end of the adjacent base plate that is not connected to the support cable. Accordingly, if the unconnected end of the base plate tends to move away from the cable, the first clamp plate connected to this end of the base plate will come into contact with the overlapping end of the second clamp plate that is attached to the cable by the first clamp plate and base plate. Therefore, movement of the unsecured end of the base plate away from the support cable will be prevented.

It is also sometimes necessary for the support cable to move in a direction that is perpendicular to the longitudinal plane of the base plates. Since the base plates are only secured to the support cable at one end, the base plates do not restrict movement in this direction. However, the overlapping male and female portions on the first and second clamp plates do generally resist movement of the support cable in this direction. However, as shown in FIG. 3, there are two layers of resilient material between the first and second clamping plates. The resilient material will compress when the support cable is moved in a direction perpendicular to the longitudinal axes of the base plates and allow the male and female portions on the first and second clamp plates to move in this direction to accommodate movement of the support cable.

Having described the invention in detail and with reference to the drawings, it will be understood that such specifications are given for the sake of explanation. Various modifications and substitutes, other than those cited, can be made without departing from the scope of the invention as defined by the following claims.

I claim:

1. Clamping apparatus comprising:
   a base plate having a male portion positioned at the first end and a female portion positioned at the second end, the base plate being adapted with apertures;
   first clamp plates positioned longitudinally along each side of the base plate, the first clamp plates having a male portion positioned at the first end and a female portion positioned at the second end, the first clamp plates being adapted with first apertures in matching relationship with the apertures of the base plate and having second apertures; and,
   second clamp plates positioned longitudinally along an outer side of each of the first clamp plates, the second clamp plates having a female portion positioned at the first end and a male portion positioned at the second end, the second clamp plates being adapted with apertures in matching relationship to the second apertures of the first clamp plates,
   means for holding said base plate and said first and second clamp plates in clamping relationship.

2. The apparatus of claim 1 wherein the male and female portions on the base plate are semi-circular in shape.

3. The apparatus of claim 1 wherein a sealing material is positioned between the first and second clamp plates.

4. Clamping apparatus comprising:
   a plurality of base plates having a male portion positioned at the first end and a female portion positioned at the second end, the base plates being adapted with apertures, the base plates being positioned in longitudinal adjacent relationship with the male portion of one base plate engaging the female portion on the adjacent base plate;
   first clamp plates positioned longitudinally along each side of the base plates, the first clamp plates having a male portion positioned at the first end and a female portion positioned at the second end, the first clamp plates being positioned with the male portion engaging the female portion on the adjacent first clamp plate, the first clamp plate being adapted with first apertures in matching relationship with the apertures of the base plate and having second apertures; and,
   second clamp plates positioned longitudinally along an outer side of each of the first clamp plates, the second clamp plates having a female portion positioned at the first end and a male portion positioned at the second end, the second clamp plates being positioned with the male portion engaging the female portion on the adjacent second clamp plate, the second clamp plates being adapted with apertures in matching relationship with the second apertures of the first clamp plates, means for holding said base plate and said first and second clamp plates in clamping relationship.

5. The apparatus of claim 4 wherein there is a space between the end regions and male and female portions on adjacent base plates.

6. The appartus of claim 4 wherein there is a space between the end regions and the male and female portions on adjacent first and second clamp plates.

7. The apparatus of claim 4 wherein the base plates are attached to a support cable.

8. The apparatus of claim 7 wherein the base plates are attached at only one end to the support cable.

* * * * *